United States Patent [19]

Ogawa et al.

[11] Patent Number: 5,786,417
[45] Date of Patent: Jul. 28, 1998

[54] WATER-DISPERSIBLE ORGANIC CLAY COMPLEX, AND RHEOLOGY CONTROL AGENT AND AQUEOUS COATING COMPOSITION CONTAINING THE SAME

[75] Inventors: Hideaki Ogawa, Hirakata; Teruaki Kuwajima, Shijonawate; Yutaka Nakao, Neyagawa; Katsuaki Yoshioka, Tokyo-to, all of Japan

[73] Assignee: Nippon Paint Co., Ltd., Osaka, Japan

[21] Appl. No.: 803,770

[22] Filed: Feb. 24, 1997

[30] Foreign Application Priority Data

Feb. 22, 1996 [JP] Japan ................... 8-035092

[51] Int. Cl.$^6$ ............... C08K 3/34; C08K 3/08; C08K 5/19

[52] U.S. Cl. ............. 524/446; 524/439; 524/440; 524/441; 524/445; 524/447; 524/449; 524/789; 524/236; 524/791

[58] Field of Search ............. 524/439, 440, 524/441, 445, 446, 447, 449, 236, 789, 791

[56] References Cited

U.S. PATENT DOCUMENTS

| | | | |
|---|---|---|---|
| 4,677,158 | 6/1987 | Tso et al. | 524/789 |
| 5,112,603 | 5/1992 | Nadolsky et al. | 524/446 |
| 5,336,647 | 8/1994 | Naé et al. | 252/8.7 |
| 5,376,604 | 12/1994 | Iwasaki et al. | 252/315.2 |
| 5,429,999 | 7/1995 | Naé et al. | 252/315.2 |
| 5,446,076 | 8/1995 | Sommese et al. | 524/446 |

FOREIGN PATENT DOCUMENTS

| | | |
|---|---|---|
| 0524503 | 1/1993 | European Pat. Off. |
| 0542266 | 5/1993 | European Pat. Off. |
| 7-187657 | 7/1995 | Japan |

Primary Examiner—Peter A. Szekely
Attorney, Agent, or Firm—Wenderoth, Lind & Ponack

[57] ABSTRACT

A water-dispersible organic clay complex in which a quaternary ammonium ion having both an oxypropylene unit and an oxyethylene unit is present in interlamellar space of an expansible phyllosilicate. This complex is excellent in dispersibility in an aqueous medium and generates excellent water resistance of the resulting coated film when used as a rheology control agent for an aqueous coating composition.

4 Claims, 10 Drawing Sheets

WATER-DISPERSIBLE ORGANIC CLAY COMPLEX, AND RHEOLOGY CONTROL AGENT AND AQUEOUS COATING COMPOSITION CONTAINING THE SAME

FIELD OF THE INVENTION

The present invention relates to a water-dispersible organic clay complex, a rheology control agent for an aqueous coating composition and an aqueous coating composition containing the same.

PRIOR ART

A typical phyllosilicate comprises a three-layered structure of sandwich form, in which a magnesium octahedral layer or aluminium octahedral layer is sandwiched between two silica tetrahedral layers. The phyllosilicate mineral is composed of several to dozens lamination of the structure.

The silicate layer in an expansible phyllosilicate which carries a negative charge, and the charge is generally neutralized with an alkali metal cation and alkali earth metal cation existing between the layers. Interlamellar space of a smectic clay or expansible mica which is a kind of expansible phyllosilicate which, is easily expanded. Thus, they are easily dispersed in water to form a sol having thixotropic property, and indicates rheology controlling ability.

However, when the smectic clay or expansible mica is directly used as a rheology control agent for an aqueous coating composition without any treatment, it easily co-agglomerates with an aqueous resin and dispersibility of the aqueous coating composition becomes poor, and therefore, rheology controlling ability is not indicated. Further, water resistance of the resulting coated film becomes extremely poor.

The expansible phyllosilicate has cation exchanging ability, and it forms an organic clay complex by reacting with various cationic organic compounds. For example, Japanese Patent Kokai Publication 187657/1995 discloses an organic clay complex containing a quaternary ammonium ion having a polyoxyethylene group and a quaternary ammonium ion having a polyoxypropylene group. This organic clay complex is dispersible in an organic solvent having relatively high polarity and can be used as a rheology control agent for a solvent-based coating composition.

However, the organic clay complex as disclosed herein has poor dispersibility in an aqueous medium, and water resistance of the resulting coated film becomes poor when it is used as a rheology control agent for an aqueous coating composition. Throughout the specification, the term "aqueous medium" means water, and a mixture of water and a water-miscible organic solvent.

SUMMARY OF THE INVENTION

The present invention solves the above-described conventional problems, and the object thereof is to provide a water-dispersible organic clay complex which has excellent dispersibility in an aqueous medium and generates excellent water resistance of the resulting coated film when used as an rheology control agent for an aqueous coating composition.

The present invention provides a water-dispersible organic clay complex in which a quaternary ammonium ion having both an oxypropylene unit and an oxyethylene unit is present in interlamellar space of an expansible phyllosilicate, and the above-described object is achieved.

DETAILED DESCRIPTION OF THE INVENTION

Figure 1:
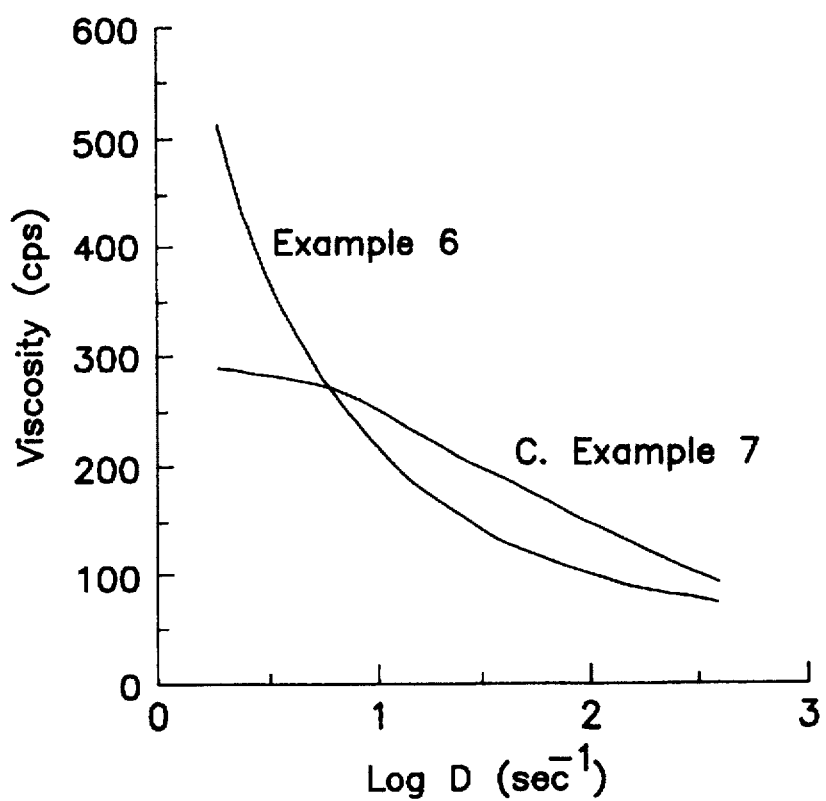
FIG. 1 shows the change in viscosity by share of aqueous coating composition compositions (Example 6, Comparative Example 7).

The expansible phyllosilicate used in the present invention includes a natural or synthesized smectic clay mineral, expansible mica, vermiculite and the like. The example of the natural smectites includes hectorite, saponite, stevensite, montmorillonite, bentonite and the like. The example of the synthetic smectites includes a compound represented by the following formula:

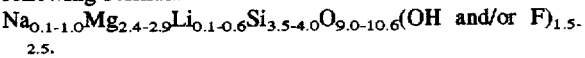
$Na_{0.1-1.0}Mg_{2.4-2.9}Li_{0.1-0.6}Si_{3.5-4.0}O_{9.0-10.6}(OH$ and/or $F)_{1.5-2.5}$.

This compound is synthesized by the method disclosed in Japanese Patent Kokai Publication 187657/1995, paragraphs 0014 to 0019. The example of the expansible mica used in the present invention includes a compound synthesized by the method disclosed in Japanese Patent Kokai Publication 187657/1995, paragraph 0020.

The expansible phyllosilicate which is preferable to be used in the present invention has an ion exchange equivalent of not less than 10 milli equivalent, preferably not less than 60 milli equivalent per 100 g. The natural and synthetic smectites generally have an ion exchange equivalent from 85 to 130 milli equivalent per 100 g. The expansible phyllosilicate may contain a non-clay impurity in an amount of not more than 50% by weight, and the preferable content of the non-clay impurity is not more than 30% by weight.

The quaternary ammonium ion used in the present invention contains both an oxypropylene unit and an oxyethylene unit in the molecule. Thereby, dispersibility of the resulting organic clay complex in an aqueous medium is improved. The molar ratio of the oxypropylene unit to the oxyethylene unit existing in the quaternary ammonium ion is from 98:2 to 30:70, preferably from 97:3 to 50:50, more preferably from 96:4 to 70:30. If the molar ratio is out of this range, stability of the coating composition and water resistance of the resulting coated film may become poor, in case that the clay complex is used as a rheology control agent for an aqueous coating composition.

The preferable quaternary ammonium ion is represented by the following formula (I) or (II):

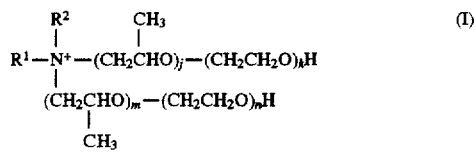

or

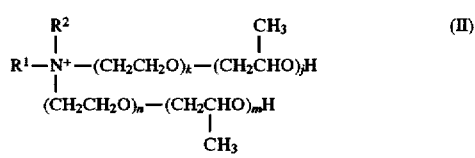

Wherein, $R^1$ is an alkyl group having 6 to 18 carbon atoms. $R^2$ is a hydrogen atom or an alkyl group or aralkyl group having up to 18 carbon atoms. If $R^1$ has less than 6 carbon atoms, an expansion of interlamellar space becomes insufficient, and the desirable effect may not be obtained. On the other hand, if $R^1$ or $R^2$ has more than 18 carbon atoms, dispersibility of the rheology control agent in the coating composition becomes poor, in case that the clay complex is used as a rheology control agent for an aqueous coating composition.

The specific example of $R^1$ includes hexyl group, octyl group, nonyl group, decyl group, dodecyl group, pentadecyl group, octadecyl group and the like. The example of $R^2$ includes methyl group, ethyl group, propyl group, butyl group, benzyl group and the like in addition to the groups which were described for the specific example of $R^1$.

In the formulae (I) and (II), j is an integer from 1 to 35, preferably from 5 to 35, k is from 0 to 20, preferably from 1 to 15, more preferably from 1 to 10, m is from 0 to 35, preferably from 5 to 35, n is from 1 to 20, preferably from 1 to 15, more preferably from 1 to 10. Further, in consideration of the molar ratio between the oxypropylene unit and the oxyethylene unit, the relation among j, k, m and n preferably suffices (j+m):(k+n)=from 98:2 to 30:70.

If j, k, m or n is out of this range, dispersibility of the rheology control agent in the coating composition and water resistance of the resulting coated film become poor, in case that the clay complex is used as a rheology control agent for an aqueous coating composition. In the preferable quaternary ammonium ion, j and m, and k and n have equal value respectively. It is because such quaternary ammonium ion is easy to be prepared.

The water-dispersible organic clay complex of the present invention is prepared by introducing the above-mentioned quaternary ammonium ion having both an oxypropylene unit and an oxyethylene unit into interlamellar space of an expansible phyllosilicate by an ion exchange method. Various other quaternary ammonium ions or inorganic cations may be introduced in the organic clay complex, unless they interfere the object of the present invention. The ratio of the amount introduced of the quaternary ammonium ion is preferably not less than 50% of the ion exchange capacity, more preferably not less than 70%.

The organic clay complex of the present invention is prepared by the method known to the art (e.g., Japanese Patent Kokai Publication 187657/1995, column 8, lines 2 to 21).

The total amount added of the quaternary ammonium salt is preferably equivalent to the cation exchange capacity of the expansible phyllosilicate as a quaternary ammonium ion, however, lesser amount may be employed for production. Excessive amount based on the cation exchange capacity may also be added. The amount of the quaternary ammonium salt is preferably from 0.5 to 1.5 times (in milli equivalent), more preferably from 0.8 to 1.4 times of the cation exchange capacity.

The reaction proceeds sufficiently at room temperature, however, it may be conducted under heating. The maximum temperature in the reaction depends on heat resistance of the quaternary ammonium salt, and can be set at any temperature less than the decomposition temperature of the salt. Then, the solid resulted is separated from the liquid, the resulting organic clay complex is washed with water to remove by-produced electrolytes sufficiently. The resulting material is optionally dried and ground.

The resulting water-dispersible organic clay complex contains a layer portion of the expansible phyllosilicate and the above-described ammonium ion. This ammonium ion is present in interlamellar space of the expansible phyllosilicate. It can be confirmed by X-ray diffraction that an expansion of the layer thickness occurs. The water-dispersible organic clay complex contains the layer portion of the expansible phyllosilicate in an amount from 10 to 80% by weight, preferably from 15 to 70% by weight, more preferably from 20 to 60% by weight. When the content of the layer portion of the expansible phyllosilicate is less than 10% by weight, sufficient rheology controlling ability is not obtained, in case that the clay complex is used as a rheology control agent for an aqueous coating composition. When the content is more than 80% by weight, dispersibility of the rheology control agent in the coating composition becomes poor. As a result, rheology controlling ability of the water-dispersible organic clay complex, appearance and water resistance of the resulting coated film become poor.

The water-dispersible organic clay complex of the present invention is used as a rheology control agent and gelling agent. The organic clay complex is added to water, preferably ion exchanged water, and dispersed by stirring and the like. The higher the addition amount, the higher the rheology control effect of the resulting rheology control agent or gelling agent, on condition that a uniform dispersion is obtained. The content of the organic clay complex in the rheology control agent is generally from 3 to 50% by weight, preferably from 4 to 40% by weight, more preferably from 6 to 30% by weight. When this content is less than 3% weight, the water content is high, therefore, the amount of the clay complex becomes small, in the case that the clay complex is used as a rheology control agent for an aqueous coating composition. When more than 50% by weight, dispersibility of the clay complex in the coating composition becomes poor. When the clay complex is used as a rheology control agent for an aqueous coating composition, the coating composition may contain additionally a compound having rheology control effect, which is different from the expansible phyllosilicate.

The water-dispersible organic clay complex of the present invention has excellent dispersibility and stability in water, and shows excellent rheology control and gelling effect in a small addition amount. Therefore, the water-dispersible organic clay complex of the present invention is extremely useful and can be used as a composition, such as a rheology control agent, viscosity controlling agent, dispersant, emulsifier, binder and the like, in an aqueous cosmetic, medicine, hygienic agent, adhesive, paint and a raw material of paint in which viscosity should be controlled. The water-dispersible organic clay complex of the present invention contains a quaternary ammonium ion having both an oxypropylene unit and an oxyethylene unit, therefore, this can also be used as an antistatic agent, germicide, dyeing aid, levelling agent and coupling agent for a plastic and textile. The water-dispersible organic clay complex has interlamellar space, therefore, this can also be used as a controlled release agent, catalyst, releasing agent, adsorbent, resin stabilizer, polymerization initiator, carrier, filler and the like.

The water-dispersible organic clay complex of the present invention is particularly suitable for controlling rheology of an aqueous coating composition containing a water-soluble or water-dispersible film forming resin. This is because water resistance of the resulting coated film does not deteriorate, even when the water-dispersible organic clay complex of the present invention is included in the aqueous coating composition.

That is, the present invention provides an aqueous coating composition containing a water-soluble or water-dispersible film forming resin, water, and the above-described water-dispersible organic clay complex. The aqueous coating composition of the present invention may optionally contain a crosslinking agent and various additives.

The content of the water-dispersible organic clay complex is from 0.5 to 20 parts by weight, preferably from 0.5 to 15 parts by weight, more preferably from 0.5 to 10 parts by weight in solid, based on 100 parts by weight of a film forming solid contained in the aqueous coating composition. When the content of the water-dispersible organic clay complex is less than 0.5 part by weight, sufficient rheology controlling ability may not be indicated. Addition of more than 20 parts by weight is not economical, since it causes no change in the resulting viscosity. The term "film forming solid" in the present specification means a solid component of a water-soluble or water-dispersible film forming resin, and when a curing agent is optionally contained, the term means the total of the solid component of a water-soluble or water-dispersible film forming resin and the solid component of the curing agent.

The example of the water-soluble or water-dispersible film forming resin includes acrylic resin, polyester resin, alkyd resin, polyurethane resin and the like. These may be used alone or in combination of more than one.

The example of the above-described acrylic resin includes, for example, a neutralized material of an acrylic resin having an acid value from about 10 to about 150, a hydroxyl value from about 20 to about 200 and a number average molecular weight from about 3000 to about 100000. The acrylic resin is generally obtained by copolymerizing a carboxyl group containing vinyl monomer (M-1), hydroxyl group containing vinyl monomer (M-2) and the other vinyl monomer (M-3), and the like. When the acid values is less than about 10, solubility in water of the acrylic resin becomes poor, and when over about 150, performance of the resulting coated film may become poor by the influence of the residual carboxyl group.

The carboxyl group containing vinyl monomer (M-1) is a compound having one or more carboxyl groups and a polymerizable unsaturated bond in one molecule, and the example thereof includes acrylic acid, methacrylic acid, crotonic acid, maleic acid, itaconic acid and the like.

The hydroxyl group containing vinyl monomer (M-2) is a compound having a hydroxyl group and a polymerizable unsaturated bond respectively in one molecule. The hydroxyl group acts as a functional group which mainly reacts with a crosslinking agent. The monomer M-2 is preferably a monoesterified compound of acrylic acid or methacrylic acid with a divalent alcohol having 2 to 10 carbon atoms, the example thereof includes 2-hydroxyethyl acrylate, 2-hydroxyethyl methacrylate, hydroxypropyl acrylate, hydroxypropyl methacrylate and the like.

The other vinyl monomer (M-3) is a compound having a polymerizable unsaturated bond in one molecule, which is different from the monomers M-1 and M-2. The example thereof includes a monoesterified compound of acrylic acid or methacrylic acid with monovalent alcohol having 1 to 20 carbon atoms, such as methyl acrylate, methyl methacrylate, ethyl acrylate, ethyl methacrylate, propyl acrylate, propyl methacrylate, butyl acrylate, butyl methacrylate, 2-ethylhexyl acrylate, 2-ethylhexyl methacrylate, cyclohexyl acrylate, cyclohexyl methacrylate, lauryl acrylate, lauryl methacrylate and the like; an aromatic vinyl monomer, such as styrene, α-methylstyrene, vinyltoluene and the like; a glycidyl group-containing vinyl monomer, such as glycidyl acrylate, glycidyl methacrylate and the like; a nitrogen-containing alkyl (1 to 20 carbon atoms) (meth) acrylate, such as dimethylaminoethyl acrylate, dimethylamino methacrylate and the like; a polymerizable unsaturated bond-containing amide compound, such as acrylic amide, methacrylic amide, dimethylacrylamide, N,N-dimethylpropylacrylamide, N-butoxymethylacrylamide, N-methylolacrylamide, N-methylolmethacrylamide, diacetoneacrylamide and the like; a vinyl compound, such as vinyl chloride, vinyl acetate, vinyl propionate and the like; a polymerizable unsaturated bond-containing nitrile compound, such as acrylonitrile, methacrylonitrile and the like; diene compound, such as butadiene, isoprene and the like; and the like. The monomer M-3 may be used alone or in combination of more than one.

The copolymerization reaction of the monomers M-1, M-2, and M-3 can be conducted in a known method. The resulting acrylic resin can be made to a water-soluble acrylic resin by neutralizing with a monoamine, and it is used in the present invention.

The acrylic resin can be made to a fine particulate water-dispersible acrylic resin having an average particle size from 0.05 to 5.0 µm, by emulsion polymerization in the presence of a dispersion stabilizer, such as a surface active agent, and it is used in the present invention. The monomer to be emulsion-polymerized is preferably selected from the group consisting of the monomers M-1, M-2, and M-3. A multi-vinyl compound (M-4) having more than one polymerizable unsaturated bonds in one molecule may additionally be used in an small amount to obtain a crosslinked particulate water-dispersible acrylic resin. The performance of the resulting coated film may be improved by using the crosslinked particulate water-dispersible acrylic resin.

The example of the compound M-4 includes ethylene glycol diacrylate, ethylene glycol dimethacrylate, triethylene glycol diacrylate, tetraethylene glycol dimethacrylate, 1,6-hexane diol diacrylate, divinyl benzene, trimethylolpropane triacrylate and the like.

The material obtained by neutralizing the water-dispersible acrylic resin with a monoamine, can be used in the present invention.

An emulsion having multi layered structure which is referred to as core/shell type, is also useful as the water-dispersible acrylic resin. The emulsion is a water dispersion in which acrylic resin fine particles dispersed therein are stabilized with a polymeric stabilizer. The acrylic resin fine particles form a core part, and the polymeric stabilizer forms a shell part of the emulsion. For example, this type of emulsion is obtained by first emulsion-polymerizing a vinyl monomer component which contains no or few carboxyl group-containing vinyl monomer (M-1), then adding a vinyl monomer component which contains a lot of carboxyl group-containing vinyl monomer (M-1), and emulsion-polymerizing the resulting mixture again. The resulting emulsion becomes thick when it is neutralized with monoamine. Thus, it is preferably employed from the view point of coating operation.

The water-dispersible urethane resin used in the present invention is an aqueous dispersion of a self emulsifying polyurethane resin having an average particle size from about 0.001 to 3.0 µm. The water-dispersible urethane resin is generally prepared from the components (a) an aliphatic or alicyclic polyisocyanate, (b) a high molecular weight polyol, (c) α, α-dimethylol monocarboxylic acid, (d) a chain extender or shortstopper, and (e) a primary or secondary monoamine. The components (a), (b), and (c), and optionally (d) are reacted in one shot method or multi stage method in the presence or absence of an organic solvent to form a carboxyl group-containing polyurethane resin. The resulting resin is mixed with water, with or after neutralization by component (e) to form a dispersion, and optionally the solvent is distilled off.

The component (a), aliphatic or alicyclic polyisocyanate, is a compound having more than one isocyanate groups and an aliphatic carbon group or alicyclic carbon group in one molecule, and the example thereof includes an aliphatic diisocyanate having 2 to 12 carbon atoms, such as hexamethylene diisocyanate (HDI), 2,2,4-trimethylhexane diisocyanate, lysine diisocyanate and the like; an alicyclic diisocyanate having 4 to 18 carbon atoms, such as 1,4-cyclohexane diisocyanate (CDI), isophorone diisocyanate (IPDI), 4,4'-dicyclohexylmethane diisocyanate (hydrogenated MDI), methylcyclohexane diisocyanate, isopropylidenedicyclohexyl-4,4'-diisocyanate, 1,3-diisocyanatomethylcyclohexane (hydrogenated XDI) and the like; an aliphatic diisocyanate having an aromatic ring, such as xylylene diisocyanate (XDI), tetramethylxylylene diisocyanate (TMXDI) and the like; a modified compound of the above-mentioned diisocyanate, such as carbodiimide, urethidone, urethoimine, biuret and isocyanurate modified compound, isocyanurate modified compound and the like; a mixture of more than one of them, and the like. Among them, HDI, IPDI, hydrogenated MDI and TMXDI are preferable. When an aromatic polyisocyanate is used as component (a), the resulting coated film easily becomes yellow in baking, or by the influence of ultraviolet ray, and it is not preferred.

The example of component (b), high molecular weight polyol, includes a compound obtained by polymerizing one or both of an alkylene oxide, such as ethylene oxide, propylene oxide, butylene oxide and the like, and a heterocyclic ether, such as tetrahydrofuran and the like. The example includes polyethylene glycol, polypropylene glycol, polyethylene-polypropylene (block or random) glycol, polyethylene-tetramethylene glycol (block or random), polytetramethylene ether glycol, polyhexamethylene ether glycol and the like; a polyester polyol, for example, a compound obtained by polycondensing an aliphatic dicarboxylic acid (succinic acid, adipic acid, sebacic acid, glutaric acid, azelaic acid and the like) or an aromatic dicarboxylic acid (isophthalic acid, terephthalic acid) with a low molecular weight glycol (ethylene glycol, propylene glycol, 1,4-butane diol, 1,6-hexane diol, 3-methyl-1,5-pentane diol, neopentyl glycol, 1,4-dihydroxymethylcyclohexane and the like), such as, polyethylene adipate diol, polybutylene adipate diol, polyhexamethylene adipate diol, polyneopentyl adipate diol, polyethylene/butylene adipate diol, poly-3-methylpentane adipate diol, polybutylene isophthalate diol and the like; polylactone polyol, for example, polycaprolactone diol or triol, poly-3-methylvalerolactone diol and the like; polycarbonate diol, for example, polyhexamethylene carbonate diol; polyolefin polyol, for example, polybutadiene glycol or hydrogenated compound thereof and the like; and a mixture of more than one of them, and the like.

The preferable compound among the high molecular weight polyols includes polyester polyol, polylactone polyol, polycarbonate polyol and a mixture of them or a mixture of a polyether polyol with them. The molecular weight of the high molecular weight polyol is preferably from 500 to 5000, more preferably from 1000 to 3000.

The component (c), α, α-dimethylol monocarboxylic acid is a component for introducing an anionic hydrophilic group into the polyurethane resin, in order to improve water stability thereof, and the example includes α, α-dimethylol acetic acid, α, α-dimethylol propionic acid, α, α-dimethylol butyric acid and the like, and preferably α, α-dimethylol propionic acid. The amount of α, α-dimethylol monocarboxylic acid is preferably from 0.3 to 5% by weight, more preferably from 0.5 to 3% by weight in terms of carboxyl group, in the urethane resin obtained by reacting components (a) to (c). When the amount is less than 0.3% by weight, stability of the resulting emulsion becomes poor, and more than 5% by weight, hydrophilicity of the polymer becomes too high, therefore viscosity of the emulsion increases and water resistance of the resulting coated film may become poor.

The component (d), chain extender or shortstopper, may optionally be used in production of the urethane resin emulsion. The chain extender employed is a low molecular weight polyol and polyamine. The example of the low molecular weight polyol includes the glycol which was described for the raw material of aforesaid polyester polyol, and an alkylene oxide low molar adduct thereof (molecular weight of less than 500); an alkylene oxide low molar adduct of bisphenol (molecular weight of less than 500); trihydric alcohol, for example, glycerine, trimethylol ethane, trimethylol propane and the like, and an alkylene oxide low molar adduct thereof (molecular weight of less than 500); and a mixture of more than one of them. The example of the polyamine includes an aliphatic polyamine, for example, ethylenediamine, N-hydroxyethylethylenediamin, tetramethylenediamine, hexamethylenediamine, diethylenetriamine and the like; an alicyclic polyamine, for example, 4,4'-diaminodicyclohexylmethane, 1,4-diaminocyclohexane, isophoronediamine and the like; an aliphatic polyamine having an aromatic ring, for example, xylylenediamine, tetramethylxylylenediamine and the like; an aromatic polyamine, for example, 4,4'-diaminodiphenylmethane, tolylenediamine, benzidine, phenylenediamine and the like; and a mixture of more than one of them.

The amount included of the chain extender is preferably from 0.3 to 30% by weight, more preferably from 0.5 to 20% by weight based on component (b), high molecular weight polyol.

The example of the shortstopper includes a low molecular weight monoalcohol (methanol, butanol, cyclohexanol and the like), monovalent alkyl amine (mono and diethylamine, mono and dibutylamine and the like), alkanol amine (mono and diethanolamine and the like) and the like.

The example of component (e), primary or secondary monoamine, used for neutralizing the carboxyl group, includes ammonia; a lower alkylamine, for example, methylamine, ethylamine, isopropylamine, n-butylamine, dimethylamine, diethylamine, diisopropylamine, di-n-butylamine and the like; an alicyclic amine, for example, cyclohexylamine and the like; a heterocyclic amine, for example, morpholine, pyridine and the like; an alkanol amine, for example, monoethanolamine, diethanolamine, monoisopropanolamine, diisopropanolamine, methylethanolamine, methylisopropanolamine and the like; and a mixture of more than one of them. Among them, the secondary alkanol amine is preferable.

The amount used of the monoamine is preferably from 0.5 to 1.5 equivalent, more preferably from 0.7 to 1.3 equivalent based on one equivalent of the carboxyl group.

The primary and secondary monoamine are also useful as a neutralizing agent for the water-soluble or water-dispersible acrylic resin.

The polyurethane resin forming reaction is conducted preferably at a temperature from 20° to 150° C., more preferably at a temperature from 50° to 120° C. If an amine is employed for the reaction, the reaction is conducted at a temperature preferably not more than 80° C., more preferably from 0° to 70° C. A conventional amine or tin based catalyst for an urethane forming reaction may also be used. When a solvent is used, it should preferably be water-soluble and has preferably a boiling point not more than that of water.

The polyester resin used in the present invention can be obtained by polycondensing a polybasic acid and a polyhydric alcohol. The polybasic acid is not particularly limited, and the example thereof includes a linear dibasic acid, such as oxalic acid, succinic acid, succinic anhydride, adipic acid, azelaic acid, sebacic acid and the like; an aromatic fatty acid such as phthalic acid, phthalic anhydride, isophthalic acid, terephthalic acid, tetrahydrophthalic anhydride, hexahydrophthalic acid, hexahydrophthalic anhydride, tetrabromophthalic anhydride, trimellitic acid, trimellitic anhydride, pyromellitic acid, pyromellitic anhydride and the like; a unsaturated dibasic acid such as, maleic acid, maleic anhydride, fumaric acid, itaconic acid, and the like.

The polyhydric alcohol is not particularly limited, and the example thereof includes glycols, such as ethylene glycol, propylene glycol, 1,3-butylene diol, 1,6-hexane diol, diethylene glycol, neopentyl glycol, triethylene glycol and the like; hydrogenated bisphenol A, bisphenoldihydroxypropyl ether, glycerine, trimethylolethane, trimethylolpropane, pentaerythritol and the like.

The polyester resin can optionally include a monobasic acid or monohydric alcohol in addition to the polybasic acids and polyhydric alcohols, in controlling the molecular weight by a conventional method.

The alkyd resin used in the present invention may be obtained by ester-modifying the polyester by using a drying oil, fatty acid and the like. The example of the drying oil and fatty acid includes a linseed oil, tung oil, oiticica oil, dehydrated castor oil, coconut oil, hydrogenated coconut oil, rice saccharide fatty acid, tall oil fatty acid, soy bean oil, octylic acid and the like. The alkyd resin may be epoxy modified resin, rosin modified resin or phenol resin modified resin. These can be produced by known methods.

The aqueous coating composition of the present invention may optionally contain a crosslinking agent and various additives as described above.

The curing agent is not particularly limited, and it may be those known to the art, as to crosslink a hydroxyl group or acid group existing in a dispersed resin. At least one of an amino compound, isocyanate compound and epoxy compound, are preferably used.

The specific example of the curing agent includes a blocked polyisocyanate, alkoxylated melamineformaldehyde condensate (the alkoxylated material of a condensate with melamineformaldehyde or paraformaldehyde, for example, methoxymethylolmelamine, isobutoxylated methylolmelamine, n-butoxylated methylolmelamine and butylated melamine), and epoxy compound having more than one epoxy groups (for example, "Epicoat 828", "Epicoat 1001", "Epicoat 1004" manufactured by Shell Chemical Corp., "Epolite 40E", "Epolite 400E", "Epolite #1600", "Epolite #721" manufactured by Kyoei Yushi K.K., "Denacol EX-301", "Denacol 622", "Denacol 512", "Denacol 421" manufactured by Nagase Kasei K.K.) and the like. The curing agents can also be used in combination with one another.

The aqueous coating composition of the present invention may optionally be added with a metallic pigment, mica pigment, coloring pigment and extender pigment which are generally used in a usual aqueous coating composition.

As the metallic pigment, for example, an aluminium pigment paste and the like is used. The mica pigment which is composed of a metal oxide may also be used. As the coloring pigment, for example, a white pigment such as titanium dioxide, an inorganic coloring agent, such as red and yellow pigments and the like, such as iron oxide, and an organic coloring agent such as Cinquacia red, Cyanine blue, Carbon black and the like are employed. As the extender pigment, clay, talc and the like are employed. These are used as a dispersion paste.

In order to improve weather resistance of the coated film formed by applying of the aqueous coating composition, a UV-light absorber and/or an antioxidant may be included in the aqueous coating composition. The preferred UV-light absorber is a benzophenolic absorber, and a hindered amine lightstabilizer. The preferred antioxidant is a phenolic antioxidant. As the other additives, there may also be added a surface regulating agent for modifying appearance of the coated film such as the other rheology controlling agent and the like.

The aqueous coating composition of the present invention can be prepared by stirring and mixing the above-described components uniformly. The condition or order of mixing the components is not particularly limited, and can be conducted in a usual procedure.

The aqueous coating composition of the present invention, can be applied in usual means such as spray coating, brush coating, dip coating, roll coating, flow coating, and the like.

The substrate to be coated may be any material made of metal or plastic. The substrate may be those primed or intercoated. An outer plate of an automobile such as a passenger car, bus, truck, auto-bike and the like is particularly suitable as the substrate to be coated. However, other substances may be used.

The aqueous coating composition of the present invention can suitably be used as a basecoating composition in the application of 2-coat 1-bake coating method. For example, the aqueous coating composition of the present invention is applied on a metal substrate to be coated so as to form about 10 to 50 μm thick dry coated film by air spray, airless spray, electrostatic coating and the like. The resulting layer is dried to make the volatile component content of not more than 25% by weight, preferably not more than 15% by weight by air drying, hot air drying or the like. A clear coating composition is then applied to the dried coated film (base coated film) to form dry film having a thickness of about 15 to 70 μm by electrostatic coating and the like. After usual setting, the resulting clear coated film and base coated film is heated at 100° to 180° C. at the same time, preferably at 120° to 160° C. for 15 to 30 minutes to give a cured coated film.

The 2-coat 1-bake coating method by using the aqueous coating composition of the present invention, provides a coated film which is excellent in water resistance, adhesion, and appearance.

The plastic substrate to be coated may optionally be degreased or primed, and the application may be conducted in the same manner as described above. In this case, however, the coats, that is, the base coated film and the clear coated film, are cured at a temperature less than the heat deformation temperature of the substrate.

All the conventional clear coating composition can be employed in the 2-coat 1-bake coating method. The example of the clear coating composition includes an organic solvent-diluted type coating composition, based on an aminoalkyd resin, acrylic resin, aminoacrylic resin, amino oil-free alkyd resin, silicone polyester resin, fluorine resin, urethane resin and the like.

There can also be used a powder coating composition which contains no organic solvent. The aqueous coating composition of the present invention may of course be applied alone.

The following Examples further illustrate the present invention in detail but are not to be construed to limit the scope thereof. In the Examples, all "parts" and "%" are by weight unless otherwise stated.

PRODUCTION EXAMPLE 1

Production of aqueous coating composition 1
(1) Production of film forming resin varnish To a 1 L reaction vessel equipped with a nitrogen introducing tube, stirrer, thermostat and condenser was charged 76 parts of ethylene glycol monobutyl ether. A monomer solution was separately prepared by mixing 15 parts of styrene, 63 parts of methyl methacrylate, 48 parts of 2-hydroxyethyl methacrylate, 117 parts of n-butyl acrylate, 27 parts of methacrylic acid, 30 parts of acrylamide and 3 parts of azobisisobutyronitrile. This monomer solution (61 parts) was added to the reaction vessel, and the resulting mixture was heated to 120° C. with stirring. Further 245 parts of the monomer solution was added over 3 hours, and stirred for 1 hours. Then, 28 parts of dimethyl ethanol amine and 200 parts of ion exchanged water were added to obtain an acrylic resin varnish having a nonvolatile content of 50%. The number average molecular weight of the resin was 12000, the OH value was 70 and the acid value was 58.

(2) Production of aluminium pigment/melamine resin dispersion paste

To 15 parts of an aluminium pigment paste (trade name "Alupaste 7160N", aluminium content 65%, manufactured by Tokyo Aluminium K.K.) was added 60 parts of a melamine resin (trade name "Urban 20SB", butylated melamine, nonvolatile content 50%, manufactured by Mitsui Toatsu K.K.), and mixed uniformly was conducted. Further, 2 parts of isostearyl phosphate (trade name "Phosrex A-180L", manufactured by Sakai Kagaku K.K.) was mixed uniformly to obtain an aluminium pigment dispersion.

(3) Production of aqueous coating composition

To a stainless vessel were charged 112 parts of the film forming resin varnish obtained in (1), and 77 parts of the aluminium pigment/melamine resin dispersion paste obtained in (2), and they were stirred by a laboratory stirrer to produce an aqueous coating composition.

PRODUCTION EXAMPLE 2

Production of aqueous coating composition 2
(1) Production of titanium oxide pigment/aqueous coating resin dispersion paste To a stainless vessel was charged 80 parts of the film forming resin varnish obtained in (1), and 72 parts of ion exchanged water, then 20 parts of a titanium oxide pigment (trade name "CR-97", manufactured by Ishihara Sangyo K.K.) was added with stirring by a laboratory stirrer. The resulting mixture was then passed through a continuous sealed horizontal dispersing apparatus ("DYNO-MILL model KDL-PILOT type", manufactured by Willy A Bachofen AG Maschinenfabrik) twice, and a titanium oxide pigment dispersion paste was obtained.

(2) Production of aqueous coating composition

To a stainless vessel were charged 100 parts of the titanium oxide pigment/aqueous coating resin dispersion paste obtained in (1), 24 parts of the film forming resin varnish obtained in (1) of Production Example 1, and 8 parts of a melamine resin (trade name "Urban 20SB", butylated melamine, nonvolatile content 50%, manufactured by Mitsui Toatsu K.K.), and they were stirred by a laboratory stirrer to produce an aqueous coating composition.

PRODUCTION EXAMPLE 3

Production of aqueous coating composition 3
(1) Production of aqueous coating composition To a stainless vessel were charged 100 parts of the titanium oxide pigment/aqueous coating resin dispersion paste obtained in (1) of Production Example 2, 20 parts of the film forming resin varnish obtained in (1) of Production Example 1, and 7.5 parts of a blocked isocyanate (trade name "Coronate 2507", manufactured by Nippon Polyurethane K.K.), and they were stirred by a laboratory stirrer to produce an aqueous coating composition.

PRODUCTION EXAMPLE 4

Production of aqueous coating composition 4
(1) Production of film forming resin varnish
(1)-1 Synthesis of hydrophilic oligomer To a 1000 ml reaction vessel equipped with a thermometer, stirrer and condenser were charged 40.2 parts of dimethylolpropionic acid, 30 parts of triethylamine and 312 parts of N-methylpyrrolidone, and they were heated and dissolved at 90° C. Then, 290 parts of isophorone diisocyanate and 700 parts of polypropylene glycol (molecular weight: 1000) were added and the resulting mixture was stirred for 10 minutes, thereafter 1.03 parts of dibutyl tin dilaurate was added. The resulting mixture then was heated to 95° C., and reacted for 1 hour.

(1)-2 Preparation of water dispersion

To a 5000 ml reaction vessel equipped with a thermometer, stirrer, condenser and dropping funnel were charged 1757 parts of ion exchanged water and 9.2 parts of a hydrazine hydrate and to this was added the urethane polymer solution obtained above with stirring. Then the resulting mixture was stirred for 30 minutes. The resulting composition was an opaque stable water dispersion. The acid value based on solid was 16.2, and the nonvolatile content was 33%.

(2) Production of aqueous coating composition

To a stainless vessel were charged 100 parts of the titanium oxide pigment/aqueous coating resin dispersion paste obtained in (1) of Production Example 2, 37 parts of the film forming resin varnish obtained in (1) and 8 parts of a melamine resin (trade name "Urban 20SB", butylated melamine, nonvolatile content 50%, manufactured by Mitsui Toatsu K.K.), and they were stirred by a laboratory stirrer to produce an aqueous coating composition.

PRODUCTION EXAMPLE 5

Production of clear coating composition
(1) Production of varnish

To a reaction vessel equipped with a nitrogen introducing tube, stirrer, thermostat and cooling tube were charged 70 parts of xylene and 20 parts of N-butanol. A monomer solution was separately prepared by mixing 1.2 parts of methacrylic acid, 26.4 parts of styrene, 26.4 parts of methyl methacrylate, 36.0 parts of N-butyl acrylate, 10.0 parts of 2-hydroxyethyl methacrylate and 1.0 parts of azobisisobutyronitrile. This monomer solution (20 parts) was added to the reaction vessel, and the resulting mixture was heated with stirring to raise the temperature. The remaining monomer solution (81.0 parts) was dropped over 2 hours with conducting reduction, then an initiator solution composed of 0.3 parts of azobisisobutyronitrile and 10 parts of xylene was added dropwise over 30 minutes. The reaction solution was refluxed with stirring for further 2 hours and the reaction was terminated to obtain an acrylic resin varnish having a nonvolatile content of 50%. The number average molecular weight of the resin was 8000 and the OH value was 48.

(2) Production of polyester resin

To a 2 L reaction vessel equipped with a nitrogen introducing tube, stirrer, thermostat, condenser and decanter were charged 134 parts of bishydroxyethyltaurine, 130 parts of neopentyl glycol, 236 parts of azelaic acid, 186 parts of phthalic anhydride and 27 parts of xylene, and the resulting mixture was heated. Water generated in the reaction was removed azeotropically with xylene. The temperature of the mixture was raised to 190° C. over about 2 hours from the initiation of the reflux, and dehydrated with stirring until the acid value in terms of the carboxylic acid reached 145, then the mixture was cooled to 140° C. With maintaining the temperature at 140° C., 314 parts of Cardula E10 (glycidyl versatate manufactured by Shell Chemical Corp.) was dropped over 30 minutes, then the reaction was continued with stirring for 2 hours, thereafter the reaction was terminated. The resulting polyester resin has a number average molecular weight of 1054, an acid value of 59 and a OH value of 90.

(3) Production of resin particles

To a 1 L reaction vessel equipped with a nitrogen introducing tube, stirrer, condenser and thermostat were charged 282 parts of ion exchanged water, 10 parts of the polyester resin produced in (2) and 0.75 parts of dimethyl ethanol amine, and they were dissolved by stirring with maintaining the temperature at 80° C. To this was added an initiator solution obtained by dissolving 45 parts of azobiscyano valeric acid into 45 parts of ion exchanged water and 4.3 parts of dimethyl ethanol amine. Then, to the reaction vessel was dropped a monomer solution composed of 70.7 parts of methyl methacrylate, 94.2 parts of N-butyl acrylate, 70.7 parts of styrene, 30 parts of 2-hydroxyethyl acrylate and 4.5 parts of ethylene glycol dimethacrylate, over 1 hour. After dropping, to this was added an initiator solution obtained by dissolving 1.5 parts of azobiscyano valeric acid into 15 parts of ion exchanged water and 1.4 parts of dimethyl ethanol amine, and the resulting mixture was stirred for 1 hour at 80° C. As a result, there was obtained an emulsion having a nonvolatile content of 45%, pH of 7.2, a viscosity of 92 cps (25° C.) and a particle size of 0.156 μm. This emulsion was spray-dried to remove water, and was added xylene in an amount 200 parts based on 100 parts of the resin particles to make a xylene dispersion of the resin particles. The particle size was 0.3 μm.

(4) Production of clear coating composition

To a stainless vessel were charged 100 parts of varnish produced in (1), 36 parts of Urban 20SE-60 (butylated melamine resin manufactured by Mitsui Toatsu K.K.), 0.5 parts of Modaflow (surface controlling agent manufactured by Monsanto Corp.) and 2.2 parts of the resin particles produced in (3), and they were stirred by a laboratory stirrer to produce a clear coating composition.

EXAMPLE 1

To a 1 L reaction vessel equipped with a stirrer, thermostat and cooling tube were charged 26 parts of the quaternary ammonium salt represented by the following formula:

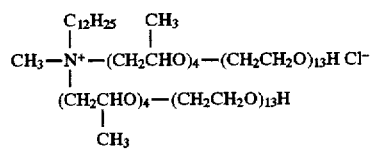

and 374 parts of ion exchanged water, and the resulting mixture was stirred and the temperature thereof was raised to 70° C. A water dispersion (600 parts) composed of 12 parts by weight of an expansible phyllosilicate (trade name "kunipia F", manufactured by Kunimine K.K.) and 588 parts of ion exchanged water was added with maintaining the temperature of the liquid in the reaction vessel at 70° C., and the mixture was stirred for 2 hours. The resulting water dispersion was concentrated by centrifugation, then 1000 parts of ion exchanged water was added for washing. The resulting water dispersion was further concentrated by centrifugation to prepare a rheology control agent for an aqueous coating composition. The solid content of the rheology control agent for an aqueous coating composition was 10%.

EXAMPLE 2

A rheology control agent for an aqueous coating composition was obtained in the same manner as described in Example 1 except that 29 parts of a compound represented by the following formula:

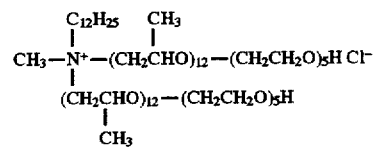

as a quaternary ammonium salt and 371 parts of ion exchanged water were used.

EXAMPLE 3

A rheology control agent for an aqueous coating composition was obtained in the same manner as described in Example 1, except that 29 parts of a compound represented by the following formula:

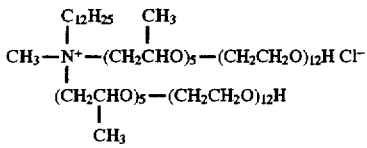

as a quaternary ammonium salt and 371 parts of ion exchanged water were used.

EXAMPLE 4

A rheology control agent for an aqueous coating composition was obtained in the same manner as described in Example 1, except that 31 parts of a compound represented by the following formula:

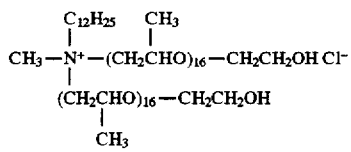

as a quaternary ammonium salt and 369 parts of ion exchanged water were used.

EXAMPLE 5

A rheology control agent for an aqueous coating composition was obtained in the same manner as described in Example 1, except that 30 parts of a compound represented by the following formula:

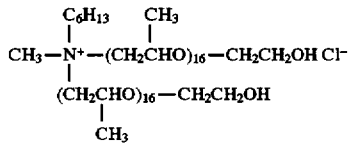

as a quaternary ammonium salt and 370 parts of ion exchanged water were used.

COMPARATIVE EXAMPLE 1

A rheology control agent for an aqueous coating composition was obtained in the same manner as described in Example 1, except that 31 parts of a compound represented by the following formula;

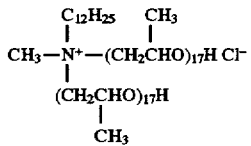

as a quaternary ammonium salt and 369 parts of ion exchanged water were used.

COMPARATIVE EXAMPLE 2

A rheology control agent for an aqueous coating composition was obtained in the same manner as described in Example 1, except that 24 parts of a compound represented by the following formula:

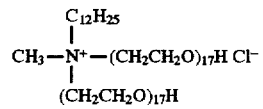

as a quaternary ammonium salt and 376 parts of ion exchanged water were used.

EXAMPLE 6

To 189 parts of the aqueous coating composition obtained in Production Example 1 was added 40 parts of the rheology control agent for an aqueous coating composition obtained in Example 1, and they were dispersed uniformly by a laboratory stirrer. Further, ion exchanged water was added so that #4FC viscosity at 20° C. became 30 seconds, to obtain an aqueous coating composition.

The dispersibility and viscosity of the resulting aqueous coating composition were evaluated as follows.

Dispersibility

The aqueous coating composition was applied on a glass plate by flowing, and the plate was observed whether there is seediness or agglomerates thereon or not.

The dispersibility was evaluated according to the following standard in three grade level. The results are shown in Table 1.

○; no seediness or agglomerate is recognized

Δ; a few seediness or agglomerates are recognized

X; a lot of seediness or agglomerates are recognized

Viscosity

The viscosity of the aqueous coating composition was measured using E type viscometer (manufactured by TOKIMEC Corp.) with changing the shear rate at one minute interval. The results are shown in FIG. 1.

A metal steel plate was degreased, and on this was formed an electrodeposited coat and intercoat for an automobile. Onto the intercoat was applied the aqueous coating composition as prepared above, in a thickness of 12 μm, and it was pre-dried at 60° C. for 5 minutes. Onto the resulting coated film was applied the solvent based clear coating composition obtained in Production Example 3, in a thickness of 35 μm, and it was baked at 130° C. for 20 minutes.

The water resistance of the resulting coated film was evaluated as follows.

Water resistance of coated film

The coated plate was immersed in a constant temperature water bath at 40° C., and 10 days after, the secondary adhesion of the coated plate was tested, according to the procedure of JIS K 5400. That is, the immersed part of the coated film was cross-cut as checkerboard, a piece of cellophane tape was applied thereon, and peeled off the cellophane tape quickly from the coated plate.

The water resistance was evaluated according to the following standard in three grade level. The results are shown in Table 1.

○; coming off of the immersed part is 0%

Δ; coming off of the immersed part is 1 to 50%

X; coming off of the immersed part is 51 to 100%

EXAMPLE 7

Figure 2:
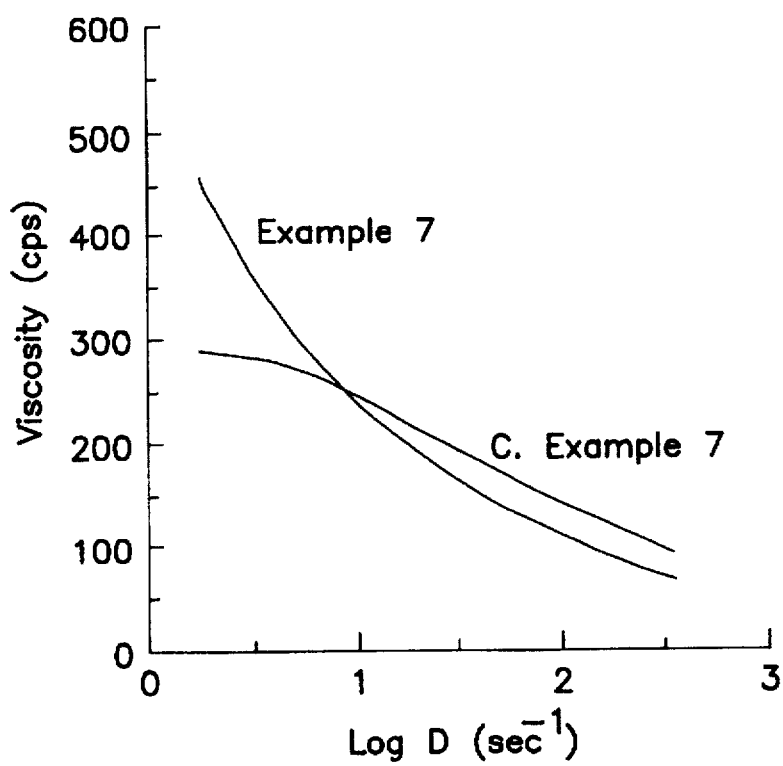
FIG. 2 shows the change in viscosity by share of aqueous coating composition compositions (Example 7, Comparative Example 7).

An aqueous coating composition and a coated film were obtained in the same manner as described in Example 6, except that the rheology control agent for the aqueous coating composition obtained in Example 2 was employed, and they were evaluated. The results are shown in Table 1 and FIG. 2.

EXAMPLE 8

Figure 3:
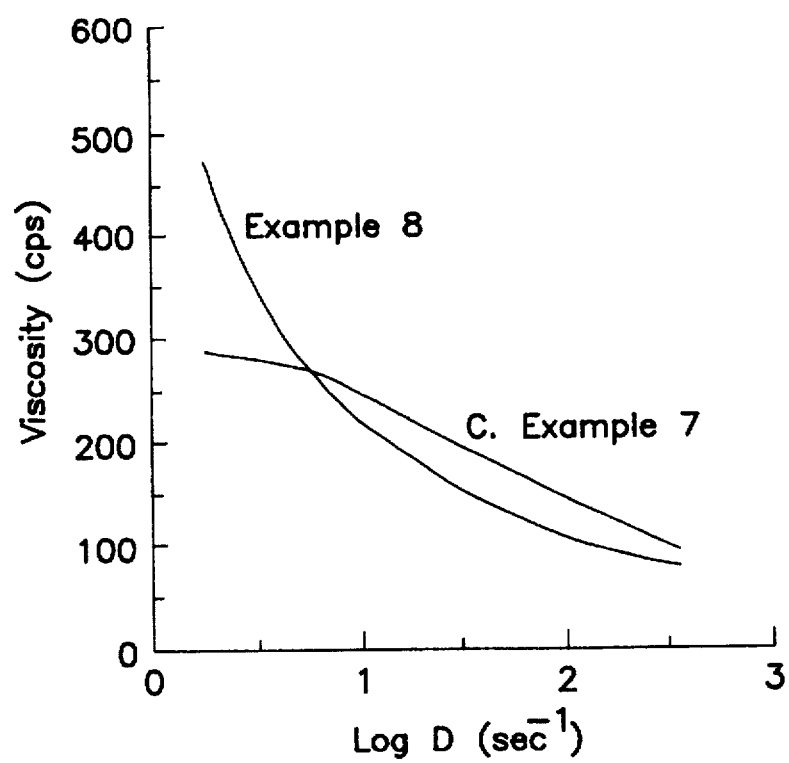
FIG. 3 shows the change in viscosity by share of aqueous coating composition compositions (Example 8, Comparative Example 7).

An aqueous coating composition and a coated film were obtained in the same manner as described in Example 6, except that the rheology control agent for an aqueous coating composition obtained in Example 3 was employed, and they were evaluated. The results are shown in Table 1 and FIG. 3.

EXAMPLE 9

Figure 4:
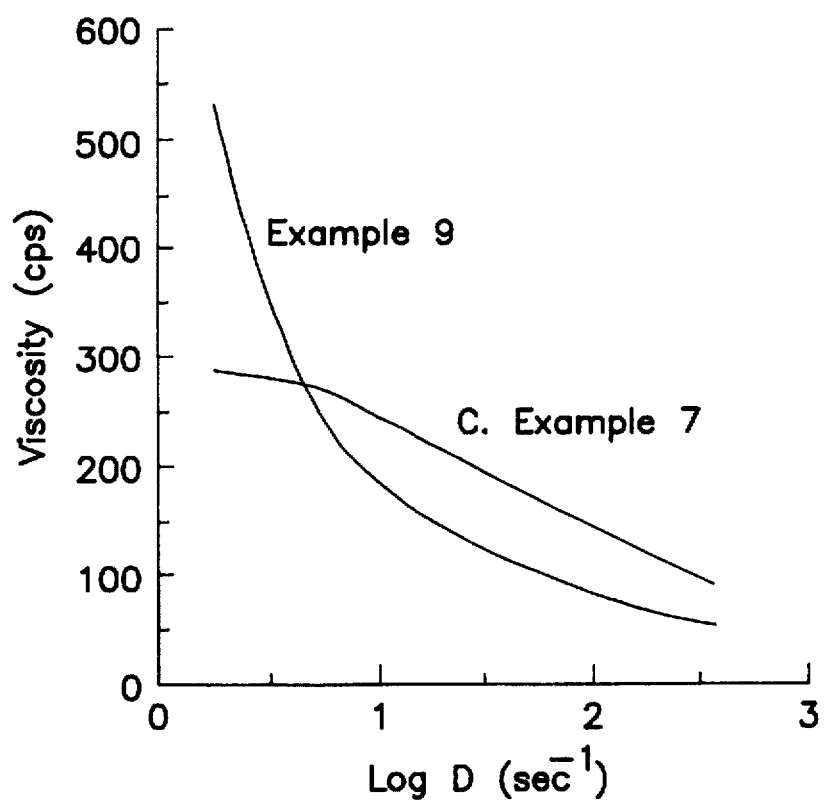
FIG. 4 shows the change in viscosity by share of aqueous coating composition compositions (Example 9, Comparative Example 7).

An aqueous coating composition and a coated film were obtained in the same manner as described in Example 6, except that the rheology control agent for an aqueous coating composition obtained in Example 4 was employed, and they were evaluated. The results are shown in Table 1 and FIG. 4.

EXAMPLE 10

Figure 5:
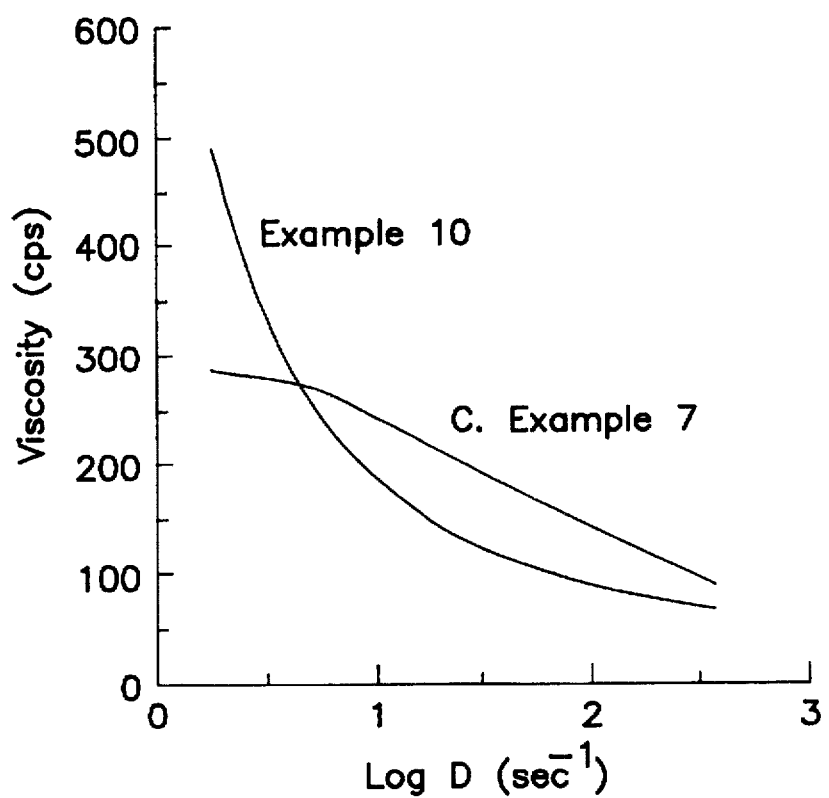
FIG. 5 shows the change in viscosity by share of aqueous coating composition compositions (Example 10, Comparative Example 7).

An aqueous coating composition and a coated film were obtained in the same manner as described in Example 6, except that the rheology control agent for an aqueous coating composition obtained in Example 5 was employed, and they were evaluated. The results are shown in Table 1 and FIG. 5.

EXAMPLE 11

To 132 parts of the aqueous coating composition obtained in Production Example 2 was added 10 parts of the rheology control agent for an aqueous coating composition obtained in Example 5, and they were dispersed uniformly by a laboratory stirrer. Further, ion exchanged water was added so that #4FC viscosity at 20° C. became 30 seconds, and an aqueous coating composition was obtained. The dispersibility and viscosity of the aqueous coating composition were evaluated as described in Example 6.

Figure 6:
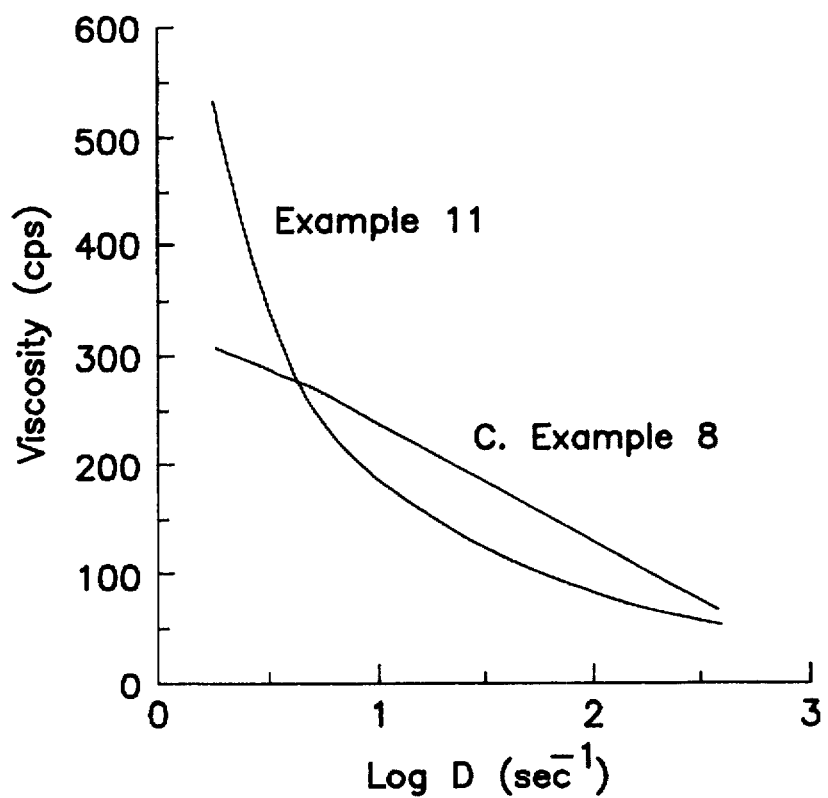
FIG. 6 shows the change in viscosity by share of aqueous coating composition compositions (Example 11, Comparative Example 8).

Then, a coated film was obtained in the same manner as described in Example 6, except that the aqueous coating composition was applied in a thickness of 35 µm, and the clear coating composition was not applied on it, and the water resistance thereof was evaluated. The results are shown in Table 1 and FIG. 6.

EXAMPLE 12

To 127.5 parts of the aqueous coating composition obtained in Production Example 3 was added 10 parts of the rheology control agent for an aqueous coating composition obtained in Example 5, and they were dispersed uniformly by a laboratory stirrer. Further, ion exchanged water was added so that #4FC viscosity at 20° C. became 30 seconds, to obtain an aqueous coating composition. The dispersibility and viscosity of the resulting aqueous coating composition were evaluated as described in Example 6.

Figure 7:
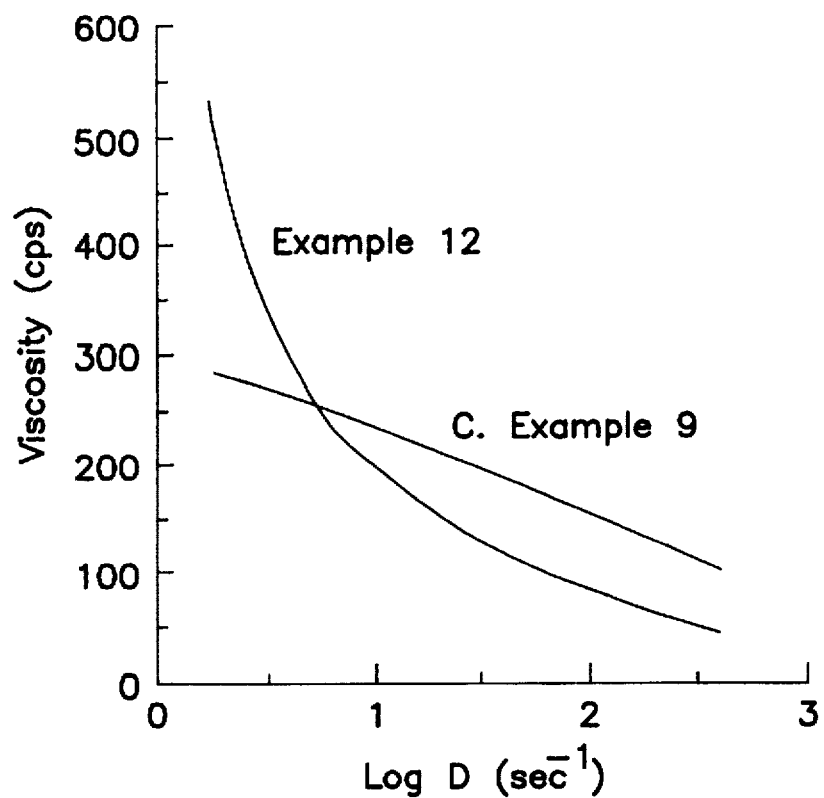
FIG. 7 shows the change in viscosity by share of aqueous coating composition compositions (Example 12, Comparative Example 9).

Then, a coated film was obtained in the same manner as described in Example 6, except that the aqueous coating composition was applied in a thickness of 35 µm, and the clear coating composition was not applied on it, and the water resistance thereof was evaluated. The results are shown in Table 1 and FIG. 7.

EXAMPLE 13

To 145 parts of the aqueous coating composition obtained in Production Example 4 was added 10 parts of the rheology control agent for an aqueous coating composition obtained in Example 5, and they were dispersed uniformly by a laboratory stirrer. Further, ion exchanged water was added so that #4FC viscosity at 20° C. became 30 seconds, to obtain an aqueous coating composition. The dispersibility and viscosity of the resulting aqueous coating composition were evaluated as described in Example 6.

Figure 8:
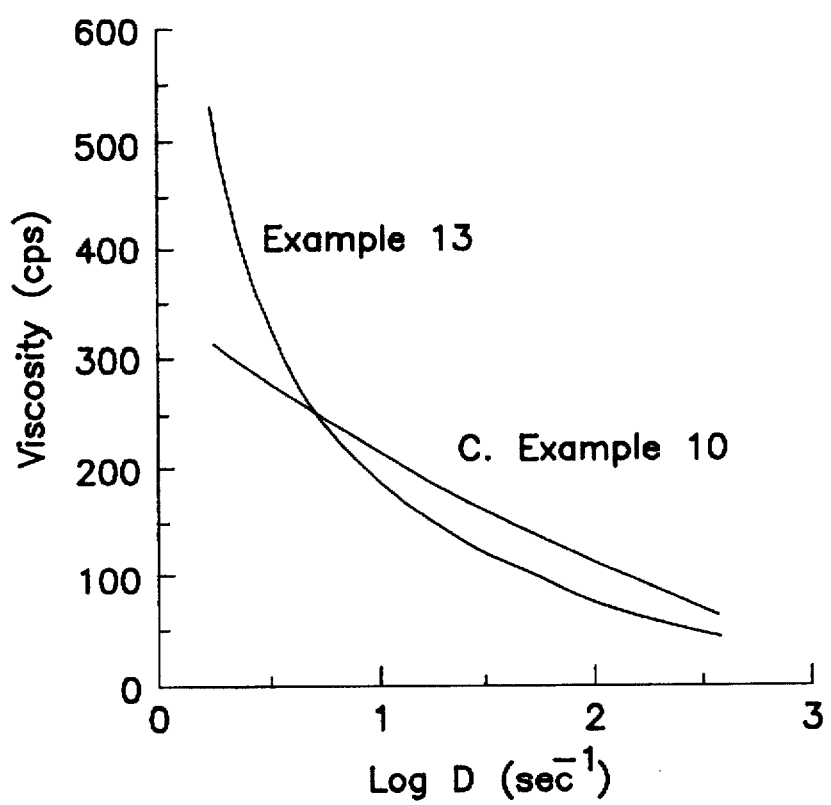
FIG. 8 shows the change in viscosity by share of aqueous coating composition compositions (Example 13, Comparative Example 10).

Then, a coated film was obtained in the same manner as described in Example 6, except that the aqueous coating composition was applied in a thickness of 35 µm, and the clear coating composition was not applied on it, and the water resistance thereof was evaluated. The results are shown in Table 1 and FIG. 8.

COMPARATIVE EXAMPLE 3

Figure 9:
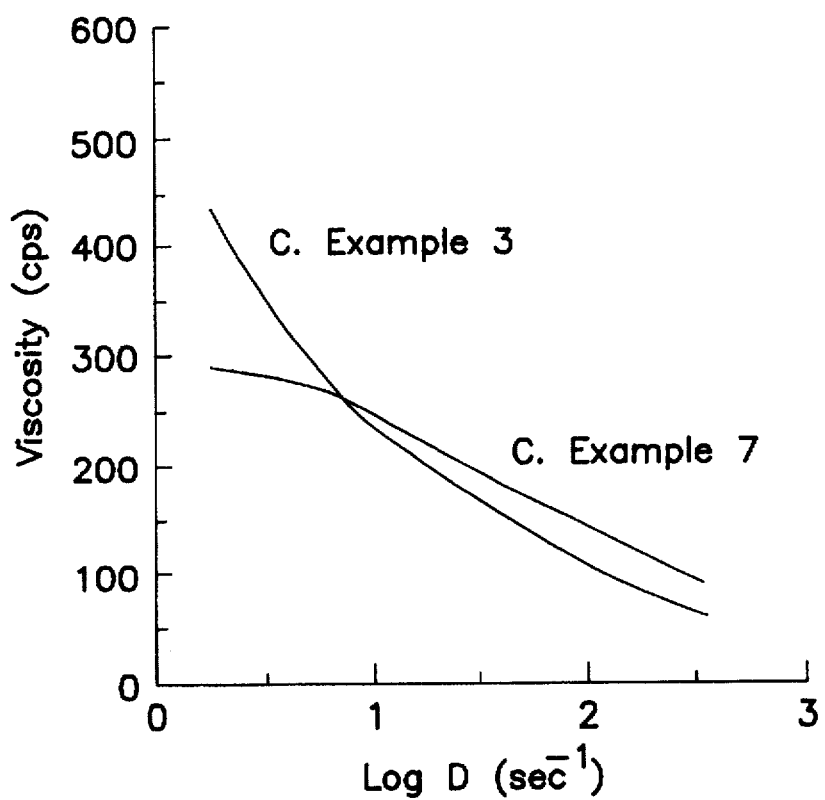
FIG. 9 shows the change in viscosity by share of aqueous coating composition compositions (Comparative Example 3, Comparative Example 7).

An aqueous coating composition and a coated film were obtained in the same manner as described in Example 6, except that the rheology control agent for an aqueous coating composition obtained in Comparative Example 1 was employed, and they were evaluated. The results are shown in Table 1 and FIG. 9.

COMPARATIVE EXAMPLE 4

Figure 10:
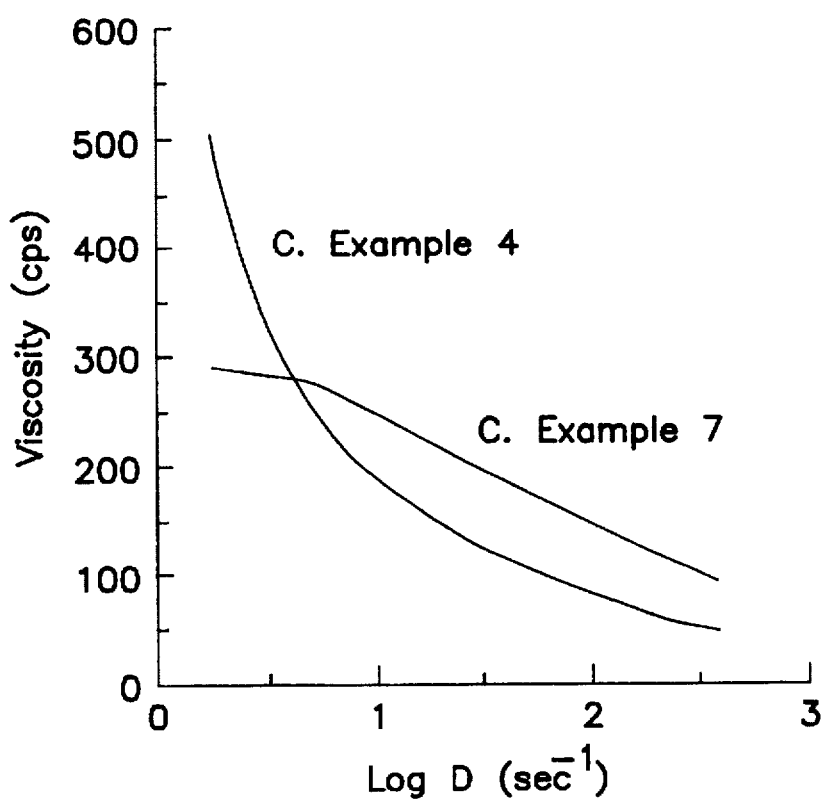
FIG. 10 shows the change in viscosity by share of aqueous coating composition compositions (Comparative Example 4, Comparative Example 7).

An aqueous coating composition and a coated film were obtained in the same manner as described in Example 6, except that the rheology control agent for an aqueous coating composition obtained in Comparative Example 2 was employed, and they were evaluated. The results are shown in Table 1 and FIG. 10.

COMPARATIVE EXAMPLE 5

Figure 11:
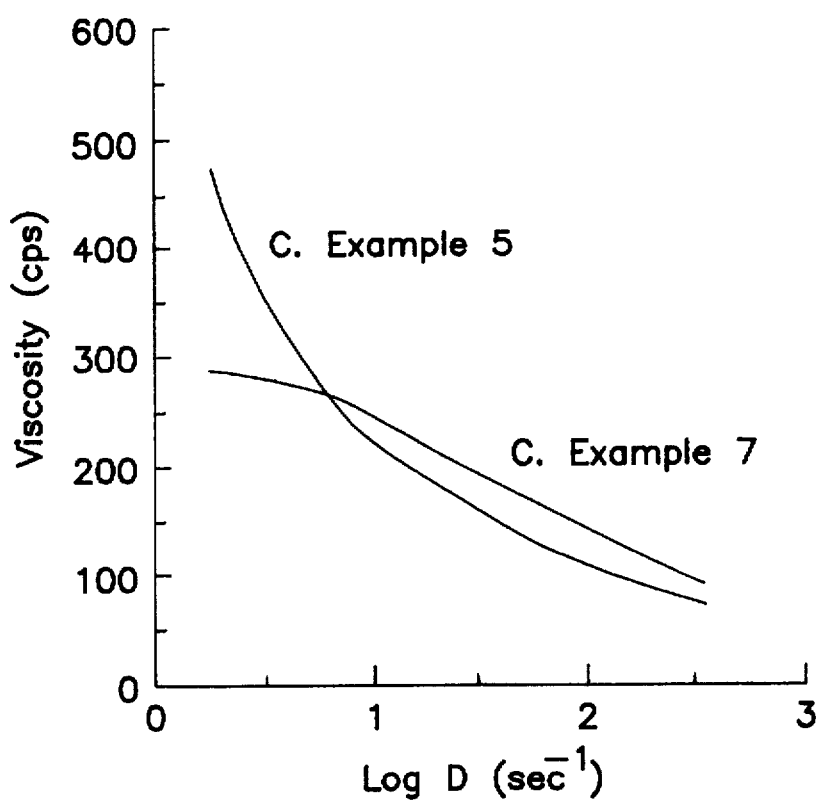
FIG. 11 shows the change in viscosity by share of aqueous coating composition compositions (Comparative Example 5, Comparative Example 7).

An aqueous coating composition and a coated film were obtained in the same manner as described in Example 6, except that 20 parts of the rheology control agent for an aqueous coating composition obtained in Comparative Example 1 and 20 parts of the rheology control agent for an aqueous coating composition obtained in Comparative Example 2 were added to 189 parts of the aqueous coating composition obtained in Production Example 1, and they were evaluated. The results are shown in Table 1 and FIG. 11.

COMPARATIVE EXAMPLE 6

To 189 parts of the aqueous coating composition obtained in Production Example 1 was added 3 parts of an expansible phyllosilicate (trade name "kunipia F", manufactured by Kunimine K.K.), and they were dispersed uniformly by a laboratory stirrer. Further, ion exchanged water was added so that #4FC viscosity at 20° C. became 30 seconds, to obtain an aqueous coating composition. The dispersibility and viscosity of the resulting aqueous coating composition were evaluated as described in Example 6. The viscosity cannot be measured due to agglomeration of the rheology control agent for an aqueous coating composition.

Then, a coated film was obtained in the same manner as described in Example 6, and the water resistance was evaluated. The results are shown in Table 1.

COMPARATIVE EXAMPLE 7

To the aqueous coating composition obtained in Production Example 1 was added ion exchanged water so that #4FC viscosity at 20° C. became 30 seconds, to obtain an aqueous coating composition. The dispersibility and viscosity of the resulting aqueous coating composition were evaluated as described in Example 6.

Then, a coated film was obtained in the same manner as described in Example 6, and the water resistance was evaluated. The results are shown in FIG. 1 to FIG. 5 and FIG. 9 to FIG. 11.

COMPARATIVE EXAMPLE 8

To the aqueous coating composition obtained in Production Example 2 was added ion exchanged water so that #4FC viscosity at 20° C. became 30 seconds, to obtain an aqueous coating composition. The dispersibility and viscosity of the resulting aqueous coating composition were evaluated as described in Example 6.

Then, a coated film was obtained in the same manner as described in Example 6, except that the aqueous coating composition was applied in a thickness of 35 μm, and the clear coating composition was not applied on it, and the water resistance thereof was evaluated. The results are shown in Table 1 and FIG. 6.

COMPARATIVE EXAMPLE 9

An aqueous coating composition and a coated film were obtained in the same manner as described in Comparative Example 8, except that the aqueous coating composition obtained in Production Example 3 was employed, and they were evaluated. The results are shown in Table 1 and FIG. 7.

COMPARATIVE EXAMPLE 10

An aqueous coating composition and a coated film were obtained in the same manner as described in Comparative Example 8, except that the aqueous coating composition obtained in Production Example 4 was employed, and they were evaluated. The results are shown in Table 1 and FIG. 8.

TABLE 1

| Example No. | Aqueous coating composition | Rheology control agent | Clear coating composition | Dispers. | Water resist. |
|---|---|---|---|---|---|
| 6 | Produc. example 1 | Example 1 | Produc. example 5 | ○ | ○ |
| 7 | Produc. example 1 | Example 2 | Produc. example 5 | ○ | ○ |
| 8 | Produc. example 1 | Example 3 | Produc. example 5 | ○ | ○ |
| 9 | Produc. example 1 | Example 4 | Produc. example 5 | ○ | ○ |
| 10 | Produc. example 1 | Example 5 | Produc. example 5 | ○ | ○ |

TABLE 1-continued

| Example No. | Aqueous coating composition | Rheology control agent | Clear coating composition | Dispers. | Water resist. |
|---|---|---|---|---|---|
| 11 | Produc. example 2 | Example 5 | — | ○ | ○ |
| 12 | Produc. example 3 | Example 5 | — | ○ | ○ |
| 13 | Produc. example 4 | Example 5 | — | ○ | ○ |
| Comp. example 3 | Produc. example 1 | Comp. example 1 | Produc. example 5 | Δ | ○ |
| Comp. example 4 | Produc. example 1 | Comp. example 1 | Produc. example 5 | ○ | Δ |
| Comp. example 5 | Produc. example 1 | Comp. exam. 1 + 2 | Produc. example 5 | Δ | Δ |
| Comp. example 6 | Produc. example 1 | Kunipia F | Produc. example 5 | x | x |
| Comp. example 7 | Produc. example 1 | — | Produc. example 5 | ○ | ○ |
| Comp. example 8 | Produc. example 2 | — | — | ○ | ○ |
| Comp. example 9 | Produc. example 3 | — | — | ○ | ○ |
| Comp. exam. 10 | Produc. example 4 | — | — | ○ | ○ |

What is claimed is:

1. An aqueous coating composition containing at least one film forming resin selected from the group consisting of a water-soluble or water-dispersible acrylic resin, alkyd resin, polyester resin and urethane resin; water; and a water-dispersible organic clay complex in which a quaternary ammonium ion having both an oxypropylene unit and an oxyethylene unit is present in interlamellar space of an expansible phyllosilicate, wherein said water-dispersible organic clay complex is present in an amount of 0.5 to 20 parts by weight in solid, based on 100 parts by weight of film forming solid components.

2. The aqueous coating composition according to claim 1, further containing at least one crosslinking agent selected from the group consisting of an amino resin, blocked isocyanate, epoxy resin and phenol resin.

3. The aqueous coating composition according to claim 1, further containing a metallic pigment or a mica pigment.

4. The aqueous coating composition according to claim 1, further containing a crosslinked particulate water-dispersible acrylic resin.

* * * * *